United States Patent
Kojima

(10) Patent No.: US 10,663,347 B2
(45) Date of Patent: May 26, 2020

(54) OPTICAL MEASUREMENT APPARATUS AND RECORDING MEDIUM

(71) Applicants: YOKOGAWA ELECTRIC CORPORATION, Tokyo (JP); Yokogawa Test & Measurement Corporation, Tokyo (JP)

(72) Inventor: Manabu Kojima, Tokyo (JP)

(73) Assignees: YOKOGAWA ELECTRIC CORPORATION, Tokyo (JP); Yokogawa Test & Measurement Corporation, Tokyo (JP)

( * ) Notice: Subject to any disclaimer, the term of this patent is extended or adjusted under 35 U.S.C. 154(b) by 0 days.

(21) Appl. No.: 16/170,878

(22) Filed: Oct. 25, 2018

(65) Prior Publication Data
US 2019/0120692 A1    Apr. 25, 2019

(30) Foreign Application Priority Data
Oct. 25, 2017    (JP) .................. 2017-205706

(51) Int. Cl.
*G01J 3/453*    (2006.01)
*G01J 3/02*    (2006.01)

(52) U.S. Cl.
CPC ........... *G01J 3/4535* (2013.01); *G01J 3/0202* (2013.01)

(58) Field of Classification Search
CPC .... G01J 3/02; G01J 3/0202; G01J 3/45; G01J 3/4535; G01B 9/02; G01B 9/02049; G01B 2290/35
See application file for complete search history.

(56) References Cited

U.S. PATENT DOCUMENTS

| | | | | |
|---|---|---|---|---|
| 5,422,721 A | * | 6/1995 | Ryan | G01J 3/4535 356/451 |
| 2011/0176138 A1 | * | 7/2011 | Khalil | G01J 3/0256 356/452 |
| 2012/0026464 A1 | * | 2/2012 | Berger | A61B 3/102 351/206 |
| 2012/0140173 A1 | * | 6/2012 | Uhlhorn | A61B 3/102 351/206 |
| 2013/0120755 A1 | * | 5/2013 | Harig | G01B 11/2441 356/455 |
| 2014/0218740 A1 | * | 8/2014 | Nebosis | A61B 5/0066 356/479 |

FOREIGN PATENT DOCUMENTS

| | | |
|---|---|---|
| JP | H02-102425 A | 4/1990 |
| JP | H07286902 A | 10/1995 |
| JP | H1048047 A | 2/1998 |

* cited by examiner

*Primary Examiner* — Jonathan M Hansen
(74) *Attorney, Agent, or Firm* — Osha Liang LLP

(57) ABSTRACT

An optical measurement apparatus includes: a moving mirror that changes an optical path length of one of two beams generated by splitting light subject to measurement; a drive mechanism that causes the moving mirror to reciprocate a predetermined distance in linear motion; a measured light receiver that detects intensity of light generated by superimposing the two beams; and a computation processor that sets a plurality of measurement ranges within the predetermined distance and calculates a measurement value based on a change in the light intensity detected by the measured light receiver for each of the measurement ranges.

6 Claims, 7 Drawing Sheets

OPTICAL MEASUREMENT APPARATUS AND RECORDING MEDIUM

CROSS-REFERENCE TO RELATED APPLICATION

This application claims priority from Japanese Patent Application No. 2017-205706 filed with the Japan Patent Office on Oct. 25, 2017, the entire content of which is hereby incorporated by reference.

BACKGROUND

1. Technical Field

The present invention relates to an optical measurement apparatus and a recording medium.

2. Description of Related Art

A method using a Michelson interferometer is known as a method for measuring the wavelength and frequency of light (JP-A-2-102425). In this method, light subject to measurement is split into two beams by a beam splitter. The beams are then superimposed again. In this case, a change in the intensity of the superimposed light that is observed when the optical path difference is changed is used as a function of the wavelength.

FIG. 6 is a block diagram illustrating the configuration of a standard optical measurement apparatus 300 using a Michelson interferometer. Light subject to measurement emitted from a measured light emitter 310 is split into two beams by a beam splitter 330. One of the beams is reflected by a fixed mirror 340. The other beam is reflected by a moving mirror 350. Both reflected light beams reenter the beam splitter 330 and are superimposed. The reflected light beams then enters a measured light receiver 360. A light receiving signal of the measured light receiver 360 is converted by a sampler 364 into digital form and is input into a computation processor 370.

When the moving mirror 350 is moved by a drive mechanism 352, a change in the intensity of the light receiving signal in accordance with the optical path difference between one optical path and the other optical path is measured as illustrated in FIG. 7. This is a synthetic waveform spectrum, the wavelength components of which are all interfered at once. The synthetic waveform spectrum is called an interferogram. In FIG. 7, for simplicity, an example where the spectral linewidth of the light subject to measurement is narrow is illustrated. However, in a case of light with a wide spectral linewidth, the light receiving signal intensity is significantly large at a point of zero optical path differences where the amplitudes of all the wavelength components are added.

The computation processor 370 performs an FFT process on the interferogram to obtain the spectrum of the light subject to measurement illustrated in FIG. 8. The peak position in FIG. 8 indicates the frequency of the light subject to measurement. The velocity of light is divided by the frequency. Accordingly, the wavelength of the light subject to measurement can be calculated. The calculated frequency and wavelength is displayed on, for example, a display 380.

In terms of implementation, reference light such as a He—Ne laser beam having a narrow spectral linewidth and a stable frequency is emitted from a reference light emitter 320. The superimposed light that has caused the same optical path difference as the light subject to measurement is then detected by a reference light receiver 362. In this manner, a sampling clock of the sampler 364 is generated on the basis of the period of a detection signal, which enables highly accurate measurement.

SUMMARY

An optical measurement apparatus according to one or more embodiments of the present invention includes a moving mirror configured to change an optical path length of one of two beams generated by splitting light subject to measurement, a drive mechanism configured to cause the moving mirror to reciprocate a predetermined distance in linear motion, a measured light receiver configured to detect intensity of light generated by superimposing the two beams, and a computation processor configured to set a plurality of measurement sections in a range of the predetermined distance and calculate a measurement value on the basis of a change in the light intensity detected by the measured light receiver for each measurement section.

DETAILED DESCRIPTION

Figure 1:
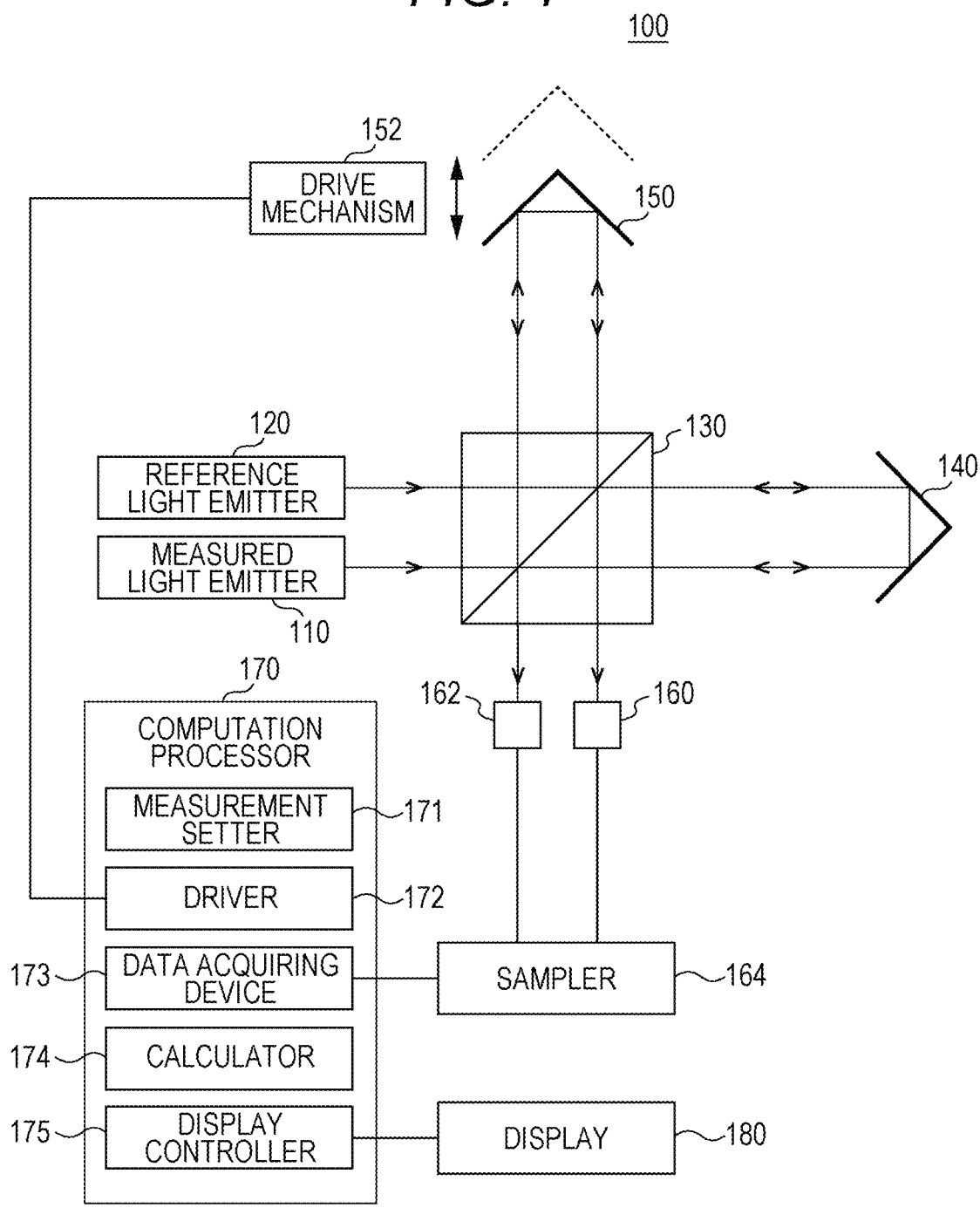
FIG. 1 is a block diagram illustrating the configuration of an optical measurement apparatus according to one or more embodiments of the present invention.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 6:
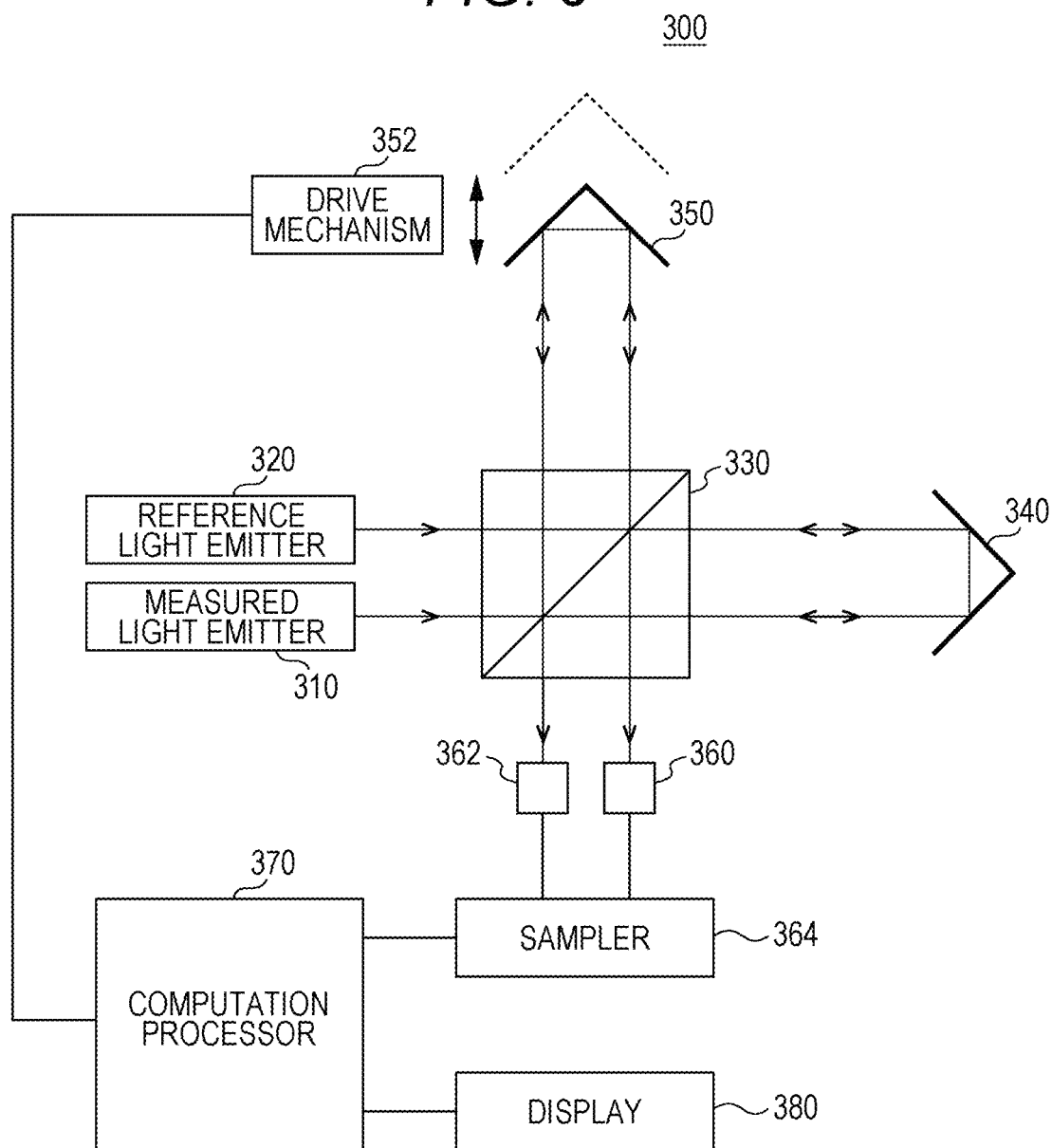
FIG. 6 is a block diagram illustrating the configuration of a standard optical measurement apparatus using a Michelson interferometer.
Figure 7:
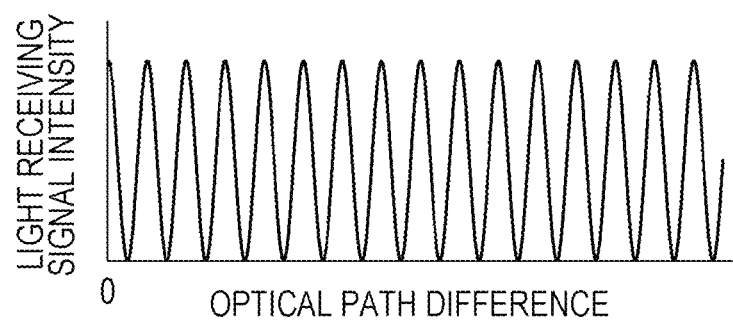
FIG. 7 is a diagram illustrating an example of an interferogram.
Figure 8:
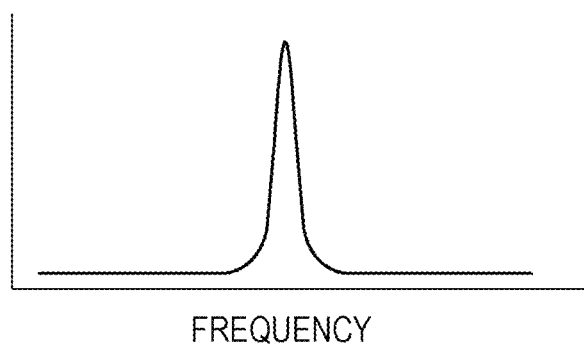
FIG. 8 is an example of a spectrum obtained by performing an FFT process on the interferogram.
Figure 9:
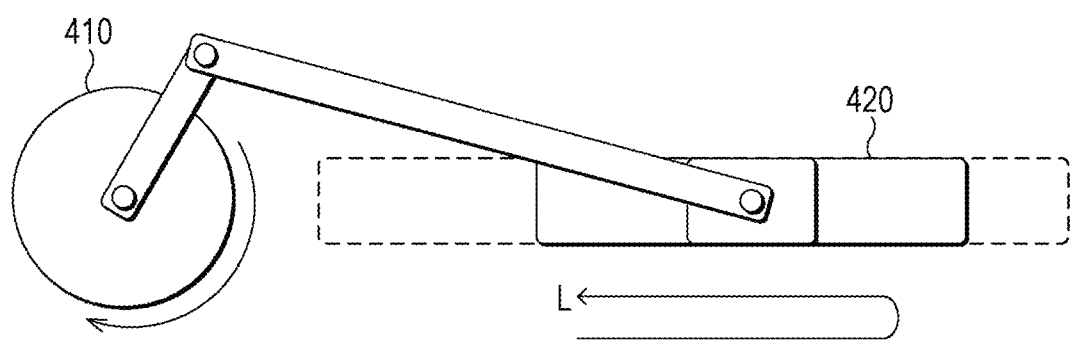
FIG. 9 is a diagram explaining a crank mechanism.

For example, a crank mechanism 400 illustrated in FIG. 9 is widely used as the drive mechanism 352 that moves the moving mirror 350 in FIG. 6. The crank mechanism 400 is a basic mechanism that converts rotational motion of a disc 410 into linear motion of a moving plate 420. The disc 410 can be rotated using, for example, a stepping motor.

The moving plate 420 reciprocates once per rotation of the disc 410 about a reference position. Let the reciprocating travel distance of the moving plate 420 at this point in time be L. The moving mirror 350 is moved in conjunction with the moving plate 420. Accordingly, the linear motion of one way L/2 can be achieved. In terms of the optical path difference, the difference in distance is doubled for both ways. Hence, the drive mechanism 352 can vary the optical path difference within, for example, a range of 0 to L, or a range of −L/2 to L/2.

Figure 10:
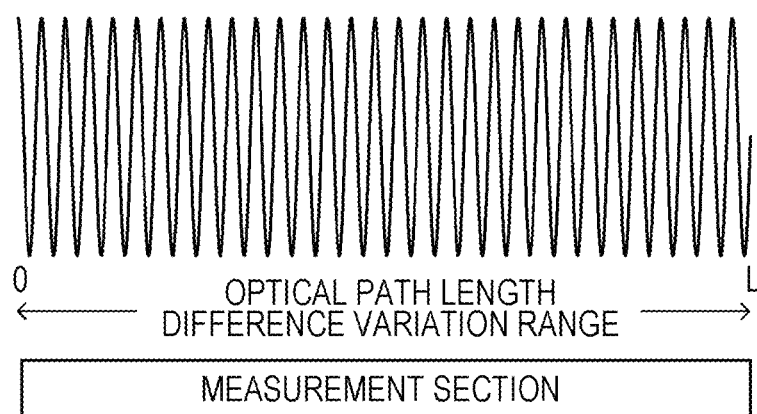
FIG. 10 is a diagram explaining a known measurement section.

In a standard method, an interferogram is generated on the basis of a measurement section as an optical path length difference variation range determined by the travel distance of the drive mechanism 352, as illustrated in FIG. 10. The frequency and wavelength of light subject to measurement is calculated.

Here, the resolution of a measurement frequency is represented by a value obtained by dividing the velocity of light by the optical path length difference variation range. In other words, as the optical path length difference variation range is increased, measurement accuracy is increased. Hence, the optical path length difference variation range physically determined by the operation of the drive mechanism 352 is set as the measurement section. Accordingly, high measurement accuracy is obtained.

Depending on the measurement purpose and the like, it may be more desirable to grasp the state of light that changes in a short time as in a transient change than to grasp the steady state of light. Examples of this include the measurement of the response performance of optical fiber communication. In such measurement where the wavelength changes with time, especially responsivity is focused. However, in the standard method, an increase in response speed is hardly considered.

Hence, one or more embodiments of the present invention improve the responsivity of an optical measurement apparatus using light interference.

An optical measurement apparatus according to one or more embodiments of the present invention includes a moving mirror configured to change an optical path length of one of two beams generated by splitting light subject to measurement, a drive mechanism configured to cause the moving mirror to reciprocate a predetermined distance in linear motion, a measured light receiver configured to detect intensity of light generated by superimposing the two beams, and a computation processor configured to set a plurality of measurement sections in a range of the predetermined distance and calculate a measurement value on the basis of a change in the light intensity detected by the measured light receiver for each measurement section.

Here, the computation processor may be configured to set the number of the measurement sections on the basis of a setting accepted from an operator.

Furthermore, the computation processor may be configured to set the plurality of measurement sections having different start timings and partially overlapping.

A control program, according to one or more embodiments of the present invention, recorded in a non-transitory computer-readable recording medium, causes an optical measurement apparatus, which includes; a moving mirror configured to change an optical path length of one of two beams generated by splitting light subject to measurement; a drive mechanism configured to cause the moving mirror to reciprocate a predetermined distance in linear motion; and a measured light receiver configured to detect intensity of light generated by superimposing the two beams, to execute: a command to set a plurality of measurement sections in a range of the predetermined distance; and a command to calculate a measurement value on the basis of a change in the light intensity detected by the measured light receiver for each measurement section.

According to one or more embodiments of the present invention, the responsivity of the optical measurement apparatus using light interference is improved.

Embodiments of the present invention are described with reference to the drawings. FIG. 1 is a block diagram illustrating the configuration of an optical measurement apparatus 100 according to one or more embodiments of the present invention. The optical measurement apparatus 100 is an apparatus that measures the frequency and wavelength of light using a Michelson interferometer.

As illustrated in FIG. 1, the optical measurement apparatus 100 includes a measured light emitter 110, a reference light emitter 120, a beam splitter 130, a fixed mirror 140, a moving mirror 150, a drive mechanism 152, a measured light receiver 160, a reference light receiver 162, a sampler 164, a computation processor 170, and a display 180.

The measured light emitter 110 is a light source of light subject to measurement, and emits the light subject to measurement. The reference light emitter 120 is a light source of reference light and emits the reference light. Here, for example, a He—Ne laser beam having a narrow spectral linewidth and a stable frequency can be used as the reference light.

The beam splitter 130 splits the light subject to measurement emitted by the measured light emitter 110 into two beams. One beam is guided to the moving mirror 150. The other beam is guided to the fixed mirror 140. In addition, light beams reflected by both mirrors are superimposed to be guided to the measured light receiver 160. Moreover, the light subject to measurement emitted by the reference light emitter 120 is also split into two beams. One beam is guided to the moving mirror 150. The other beam is guided to the fixed mirror 140. In addition, light beams reflected by both mirrors are superimposed to be guided to the reference light receiver 162.

The drive mechanism 152 causes the moving mirror 150 to reciprocate a predetermined distance in linear motion. The moving mirror 150 moves to change an optical path length of one of the split light beams subject to measurement. The drive mechanism 152 can be configured of, for example, a crank mechanism. The operation of the drive mechanism 152 allows the optical path length difference variation range to be physically determined.

The sampler 164 generates a sampling clock on the basis of the period of a detection signal of the reference light receiver 162. The sampler 164 then converts the detection signal of the measured light receiver 160 into digital form. The display 180 can be configured of, for example, a liquid crystal display device. The display 180 displays an operation menu and a measurement result.

The measured light receiver 160 receives light generated by superimposing the split light beams subject to measurement again. The measured light receiver 160 then outputs the detection signal in accordance with the intensity of the received light. The reference light receiver 162 receives light generated by superimposition the split reference light beams again. The measured light receiver 160 then outputs the detection signal in accordance with the intensity of the received light.

The computation processor 170 can be configured of, for example, a microcontroller that operates in accordance with a control program recorded in a non-transitory computer-readable recording medium. The computation processor 170 includes a measurement setter 171, a driver 172, a data acquiring device 173, a calculator 174, and a display controller 175.

The measurement setter 171 accepts a setting related to measurement from an operator. In one or more embodiments of the present invention, especially responsivity priority or accuracy priority can be set. The measurement setter 171 may be configured in such a manner that in the setting of responsivity priority or accuracy priority, the level of the priority can be set from a plurality of degrees.

The driver 172 controls the drive mechanism 152. The driver 172 moves the moving mirror 150 in synchronization with the measurement. The data acquiring device 173 acquires the detection signal of the measured light receiver 160 via the sampler 164.

The calculator 174 calculates the frequency and wavelength of the light subject to measurement on the basis of the detection signal of the measured light receiver 160. Specifically, an FFT process is performed on an interferogram that indicates a change in the intensity of the detection signal in accordance with a change in optical path length to calculate the frequency of the light subject to measurement. Moreover, the wavelength of the light subject to measurement is calculated on the basis of the calculated frequency and the velocity of light.

The display controller 175 controls the display 180. The display controller 175 causes the display 180 to display the operation menu and a measurement result.

In the optical measurement apparatus 100, the light subject to measurement emitted from the measured light emitter 110 is split into two beams by the beam splitter 130. One beam is reflected by the fixed mirror 140. The other beam is reflected by the moving mirror 150. Both reflected light beams reenter the beam splitter 130 and are superimposed. The light generated by the superimposition enters the measured light receiver 160.

Moreover, the reference light emitted from the reference light emitter 120 is also split into two beams by the beam splitter 130. One beam is reflected by the fixed mirror 140. The other beam is reflected by the moving mirror 150. Both reflected light beams reenter the beam splitter 130 and are superimposed. The light generated by the superimposition enters the reference light receiver 162.

The optical path length of the light subject to measurement via the fixed mirror 140 and the optical path length of the reference light via the fixed mirror 140 are adjusted to be equal to each other. Similarly, the optical path length of the light subject to measurement via the moving mirror 150 and the optical path length of the reference light via the moving mirror 150 are adjusted to be equal to each other.

Figure 2:
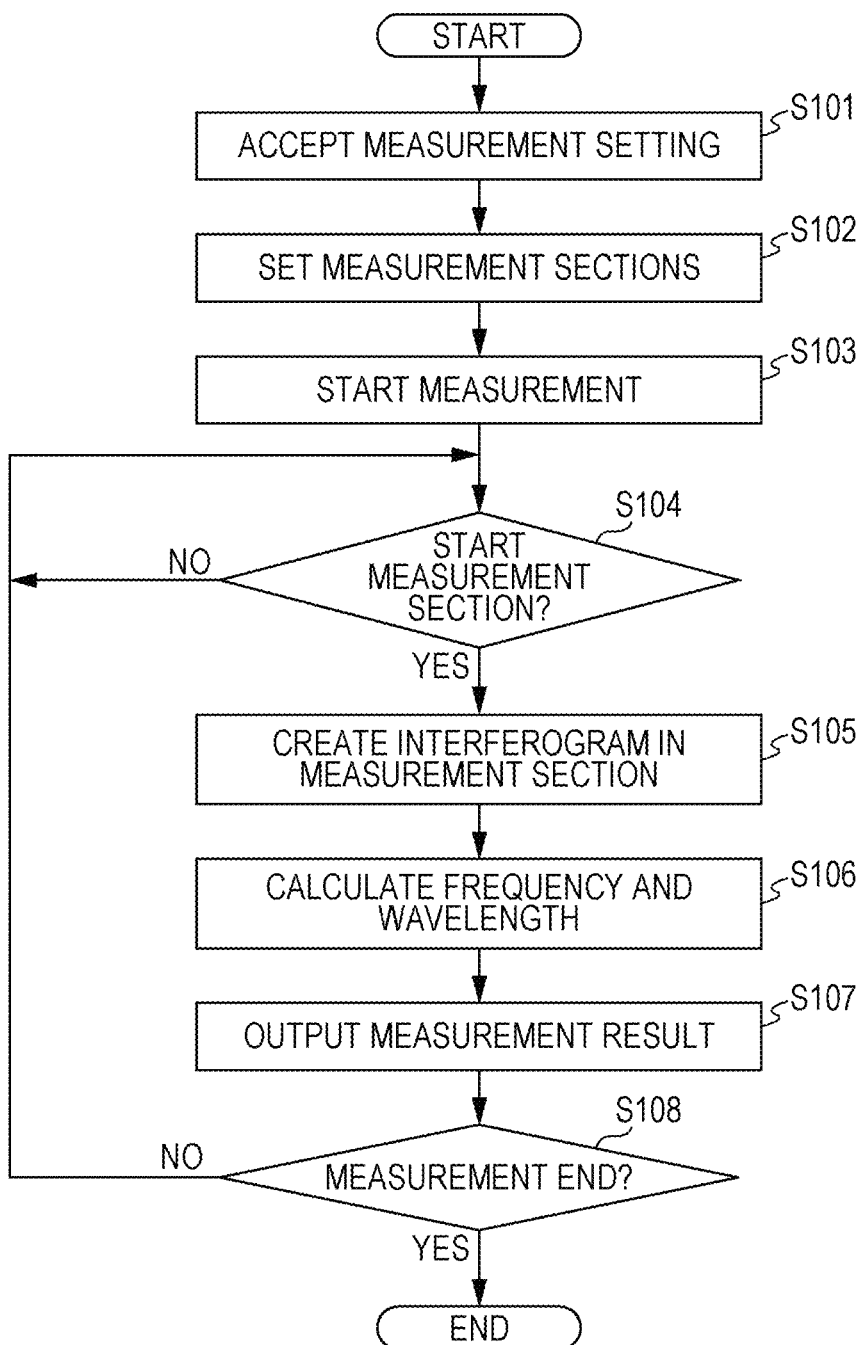
FIG. 2 is a flowchart explaining the operation of the optical measurement apparatus according to one or more embodiments of the present invention.

The operation of the optical measurement apparatus 100 with the above configuration is described with reference to a flowchart of FIG. 2. Firstly, prior to an actual measurement, the measurement setter 171 accepts a setting related to the measurement from an operator (S101). The measurement setting can be accepted by accepting, for example, an operation selected from the operation menu displayed on the display 180.

Figure 3:
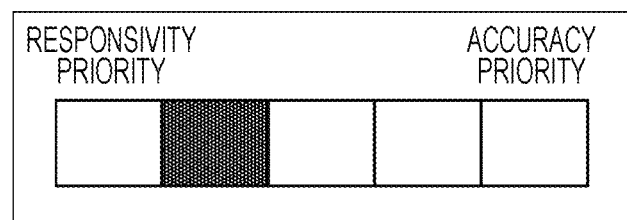
FIG. 3 is a diagram illustrating an example of the setting of responsivity priority and accuracy priority according to one or more embodiments of the present invention.

Here, the setting of responsivity priority or accuracy priority is described as the setting related to the measurement. As illustrated in FIG. 3, the level of the priority may be set at a plurality of degrees. In an example of FIG. 3, the level of the priority is divided into five degrees. A higher priority is given to the responsivity as a level closer to the left is set. A higher priority is given to the accuracy as a level closer to the right is set. In FIG. 3, the second level from the left, "a little higher priority to responsivity", is set. Naturally, the number of the settable levels is not limited to five.

Responsivity priority or accuracy priority is set since responsivity and measurement accuracy are in a trade-off relationship as described below. The operator can appropriately set responsivity priority or accuracy priority according to, for example, the purpose of measurement.

Next, the measurement setter 171 sets measurement sections on the basis of the setting of responsivity priority or accuracy priority (S102). In one or more embodiments of the present invention, a plurality of measurement sections can be set in the optical path length difference variation range physically determined by the operation of the drive mechanism 152.

Figure 4:
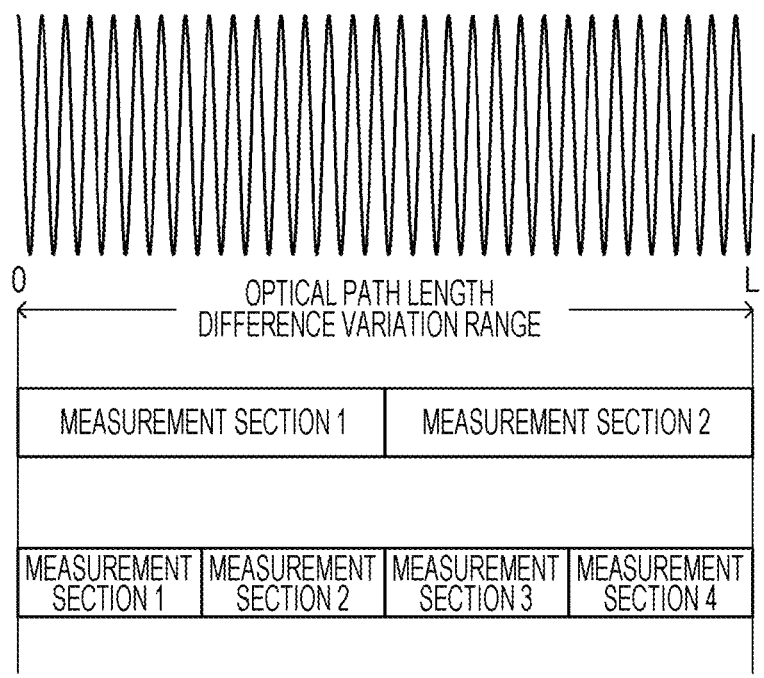
FIG. 4 is a diagram explaining an example of measurement sections according to one or more embodiments of the present invention.

For example, FIG. 4 illustrates an example of a case where two measurement sections, "measurement section 1" and "measurement section 2," are set in the optical path length difference variation range, and an example of a case where four measurement sections, "measurement section 1," "measurement section 2," "measurement section 3," and "measurement section 4," are set. The number of measurement sections is not limited to two or four. Moreover, a section where a measurement is not made may be provided between measurement sections. In terms of implementation, in the FFT process, data of the n-th power of two are used. Hence, the number of measurement sections and the number of sampling data are adjusted.

The frequency and wavelength of the light subject to measurement is calculated on the basis of an interferogram created for each measurement section. Hence, if two measurement sections are set, two measurement results are output while the moving mirror 150 moves within the optical path length difference variation range. If four measurement sections are set, four measurement results are output while the moving mirror 150 moves within the optical path length difference variation range. Consequently, the responsivity of the optical measurement apparatus 100 is improved.

As the number of measurement sections set in the optical path length difference variation range is increased, responsivity is increased. On the other hand, however, as the measurement section length is reduced, accuracy is reduced. This is because the resolution of the measurement frequency is represented by the value obtained by dividing the velocity of light by the optical path length difference variation range length.

Hence, the optical measurement apparatus according to one or more embodiments of the present invention is configured in such a manner that an operator can set responsivity priority or accuracy priority. In other words, if importance is placed on responsivity in measurement, accuracy is reduced on purpose to shorten the measurement sections. Accordingly, a measurement value can be output in a short period. However, the optical measurement apparatus may be designed in such a manner as to always give a higher priority to responsivity, skipping the acceptance of a setting from an operator.

The measurement setter 171 can set more measurement sections as the level of responsivity priority set by the operator is increased, whereas the measurement setter 171 can set fewer measurement sections as the level of accuracy priority set by the operator is increased. If the number of measurement sections is one, a measurement can be made, giving the highest priority to accuracy. In a standard apparatus, one measurement section is always set over the entire optical path length difference variation range. Hence, this apparatus is substantially set in such a manner as to uniformly give priority to accuracy.

After the measurement sections are set, the measurement is started (S103). In other words, the light subject to measurement and the reference light are emitted. In addition, the travel of the moving mirror 150 and the sampling of the detection signal start.

In the measurement, when it comes to the timing to start a measurement section (S104: Yes), the calculator 174 creates an interferogram in the measurement section (S105). The frequency and wavelength of the measurement light is calculated by the calculator 174 on the basis of the created interferogram (S106). A timestamp in the calculation result is recorded. Consequently, the relationship between time and frequency, and the relationship between time and wavelength are obtained. As a result, a transient change in the frequency and wavelength of the measurement light can be grasped.

The calculated frequency and wavelength is output as a measurement result via the display 180 and the like (S107).

The above processes are repeated until the measurement ends (S108). Consequently, a measurement result is obtained for each measurement section.

Figure 5:
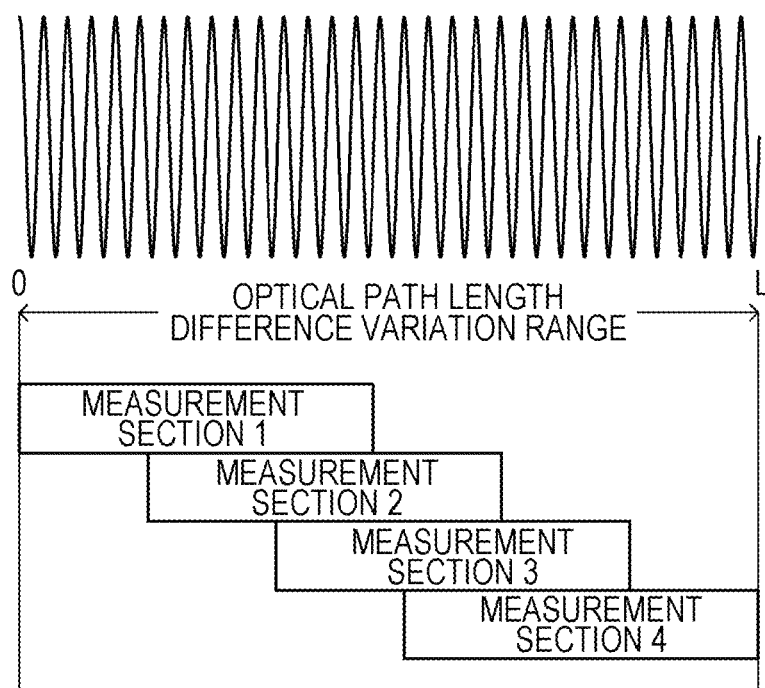
FIG. 5 is a diagram explaining another example of measurement sections according to one or more embodiments of the present invention.

As described above, as the number of measurement sections set in the optical path length difference variation range is increased, responsivity is increased. On the other hand, as the measurement section length is reduced, accuracy is reduced. Hence, as illustrated in FIG. 5, a plurality of measurement sections having different start timings and partially overlapping can be set. Consequently, high responsivity can be obtained while a dramatic reduction in accuracy is suppressed. Also in this case, the length and number of measurement sections are adjusted in such a manner as to make the number of sampling data of each measurement section the n-th power of two.

The optical measurement apparatus of the present invention may be the following first to third optical measurement apparatuses:

The first optical measurement apparatus is characterized by including: a moving mirror configured to change an optical path length of one of split light beams subject to measurement; a drive mechanism configured to cause the moving mirror to reciprocate a predetermined distance in linear motion; a measured light receiver configured to detect intensity of light obtained by superimposing the split light beams subject to measurement; and a computation processor configured to set a plurality of measurement sections in an optical path length difference variation range determined by the predetermined distance, and calculate a measurement value on the basis of a change in the detected light intensity for each measurement section.

The second optical measurement apparatus is the first optical measurement apparatus characterized in that the computation processor sets the number of the measurement sections on the basis of a setting accepted from an operator.

The third optical measurement apparatus is the first or second optical measurement apparatus characterized in that the computation processor overlaps and sets the plurality of measurement sections whose start timings are different.

The control program of the present invention may be a control program that causes an optical measurement apparatus, which includes: a moving mirror configured to change an optical path length of one of split light beams subject to measurement; a drive mechanism configured to cause the moving mirror to reciprocate a predetermined distance in linear motion; and a measured light receiver configured to detect intensity of light obtained by superimposing the split light beams subject to measurement, to set a plurality of measurement sections in an optical path length difference variation range determined by the predetermined distance, and perform a measurement value calculation operation on the basis of a change in the detected light intensity for each measurement section.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An optical measurement apparatus comprising:
    a moving mirror that changes an optical path length of one of two beams generated by splitting light subject to measurement;
    a drive mechanism that causes the moving mirror to reciprocate in a linear motion;
    a measured light receiver that detects intensity of light generated by superimposing the two beams; and
    a computation processor that sets a plurality of measurement ranges within a measurable range determined based on a movable distance of the moving mirror and calculates a measurement value based on a change in the intensity of light detected by the measured light receiver for each of the measurement ranges, wherein
    the light detected for one of the measurement ranges has a different frequency from a frequency of the light detected for another of the measurement ranges that is adjacent to the one of the measurement ranges.

2. The optical measurement apparatus according to claim 1, wherein
    the computation processor sets the number of the measurement ranges based on a setting by an operator.

3. The optical measurement apparatus according to claim 1, wherein
    the computation processor sets the plurality of measurement ranges that have different start timings and partially overlap each other.

4. A non-transitory computer-readable recording medium recording a control program causing an optical measurement apparatus to execute, wherein the optical measurement apparatus comprises: a moving mirror that changes an optical path length of one of two beams generated by splitting light subject to measurement; a drive mechanism that causes the moving mirror to reciprocate in a linear motion; and a measured light receiver that detects intensity of light generated by superimposing the two beams:
    setting a plurality of measurement ranges within a measurable range determined based on a movable distance of the moving mirror; and calculating a measurement value based on a change in the intensity of light detected by the measured light receiver for each of the measurement ranges, wherein the light detected for one of the measurement ranges has a different frequency from a frequency of the light detected for another of the measurement ranges that is adjacent to the one of the measurement ranges.

5. The optical measurement apparatus according to claim 2, wherein the setting determines whether responsivity or accuracy is given priority, and if the responsivity is given the priority, the number of the measurement ranges is set to be larger than the number of the measurement ranges in the case that the accuracy is given the priority.

6. The optical measurement apparatus according to claim 1, further comprising:

a light emitter that comprises:

a first light emitter that emits reference light, and a second light emitter that emits the light subject to measurement, wherein a moving mirror changes the optical path length of one of two beams generated by splitting the light emitted from the light emitter, and the measured light receiver comprises a first light receiver that detects intensity of light generated by superimposing the two beams generated from the reference light, and a second light receiver that detects intensity of light generated by superimposing the two beams generated from the light subject to measurement.

* * * * *